United States Patent [19]

Fuchs

[11] Patent Number: 4,930,817
[45] Date of Patent: Jun. 5, 1990

[54] STRUCTURAL PART COMPRISING A FLANGE AND AT LEAST ONE EXHAUST GAS TUBE, IN PARTICULAR EXHAUST GAS BEND, AND PROCESS FOR THE PRODUCTION THEREOF

[75] Inventor: Peter Fuchs, St. Aegyd, Austria

[73] Assignee: Vastag Automobiltechnik Gesellschaft m.b.H., Eisenwerk, Austria

[21] Appl. No.: 347,741

[22] Filed: May 5, 1989

[30] Foreign Application Priority Data

May 25, 1988 [AT] Austria .................. 1372/88

[51] Int. Cl.$^5$ ............................. F16L 5/00
[52] U.S. Cl. ............... 285/189; 285/286; 285/332; 228/173.4; 29/890.08
[58] Field of Search ........ 285/189, 332, 286; 228/173.4; 29/157.4

[56] References Cited

U.S. PATENT DOCUMENTS

| | | | |
|---|---|---|---|
| 1,810,091 | 6/1931 | Seigle | 285/332 X |
| 1,889,795 | 12/1932 | Smith et al. | 285/286 X |
| 2,498,831 | 2/1950 | Veitch | 285/286 |
| 2,711,912 | 6/1955 | Boice | 285/286 |
| 3,572,770 | 3/1971 | Kagi | 285/286 X |
| 3,589,751 | 6/1971 | Esnaud | 285/332 X |
| 4,013,309 | 3/1977 | Quick | 285/332 X |
| 4,082,325 | 4/1978 | Laundy | 285/286 X |
| 4,579,273 | 4/1986 | Dahmen et al. | 285/286 X |
| 4,674,567 | 6/1987 | Keintzel et al. | 285/286 X |
| 4,832,383 | 5/1989 | Roussel | 285/416 |

FOREIGN PATENT DOCUMENTS 3038181 4/1981 Fed. Rep. of Germany .

Primary Examiner—Randolph A. Reese
Assistant Examiner—Carol I. Bordas
Attorney, Agent, or Firm—Nixon & Vanderhye

[57] ABSTRACT

The invention refers to a structural part comprising a flange (6) and at least one exhaust gas tube (1) being inserted into a perforation (5) of the flange (6) and being connected therewith by a welding seam (11) arranged on the free end (2) of the exhaust gas tube (1), in particular to an exhaust gas bend for internal combustion engines. The end (4) of the exhaust gas tube (1) is reduced in diameter and tapers in opposite direction to the flow direction (8) of the exhaust gases. The wall (7) of the perforation (5) tapers with the same tapering angle ($\alpha$) as does the end (4) of the exhaust gas tube (1). The tapering end (4) of the exhaust gas tube (1) snugly engages the wall (9) of the perforation (5) over at least part of the thickness (13) of the flange (6). The tapering end (4) of the exhaust gas tube (1) is seated within the tapering area (9) of the perforation (5) of the flange by press fit. On account of the firm seat of the tapered end (4) of the exhaust gas tube (1) within the tapered perforation (5), there are received all mechanical and thermal stresses acting at the connection area.

5 Claims, 1 Drawing Sheet

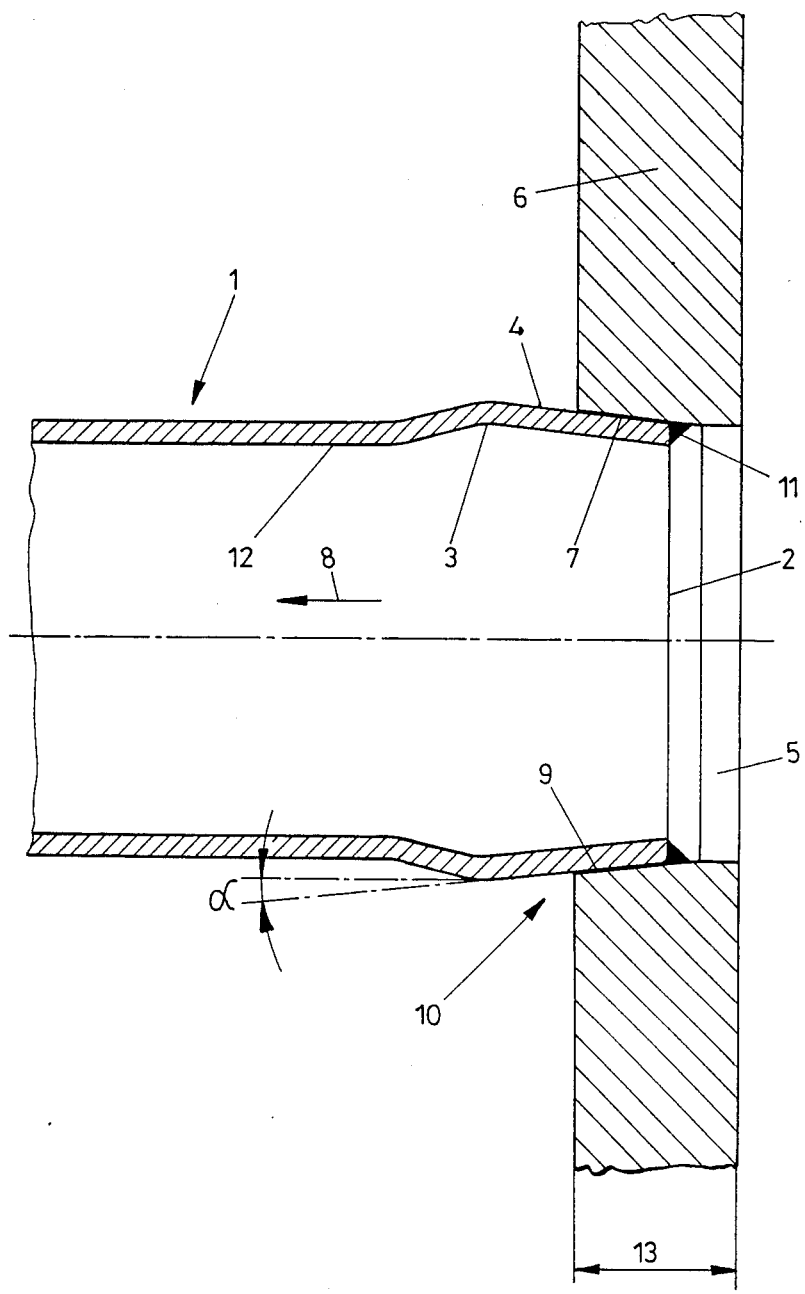

STRUCTURAL PART COMPRISING A FLANGE AND AT LEAST ONE EXHAUST GAS TUBE, IN PARTICULAR EXHAUST GAS BEND, AND PROCESS FOR THE PRODUCTION THEREOF

BACKGROUND OF THE INVENTION

1. Field of the Invention

The invention refers to a structural part comprising a flange and at least one exhaust gas tube having its end located within a perforation of the flange and being connected therewith by a welding seam arranged on the free end of the exhaust gas tube, in particular exhaust gas bend for internal combustion engines.

2. Description of the Prior Art

In an exhaust gas bend having become known from the DE-AS 15 76 357, the exhaust gas tube is introduced into a perforation of the flange and the free end of the exhaust gas tube is connected with the flange by a welding seam. The perforation of the flange has at its lower area a wall surface including with the surface of the flange an angle of approximately 60° being open in outward direction, so that the exhaust gas tube is located with its bottom side completely free in this perforation and is connected with the flange only by the welding seam at the free end of the exhaust gas tube. This welding seam must thus resist any stress acting on the exhaust gas tube for mechanical reasons and on account of thermal expansion. In such an arrangement, there thus exists on account of the continuously acting stress the risk that fractures occur at the area of the welding seam and that thus the connection between the exhaust gas tube and the flange becomes loosened or at least untight. From the DE-OS 30 38 181 there has become known a connection between the end of an exhaust gas tube with a flange, in which connection the end of the exhaust gas tube and the perforation of the flange are tapered in flow direction of the exhaust gases. In this known arrangement, the tube end is in fact snugly engaging at all sides the wall of the perforation of the flange, but the exhaust gas tube must be introduced over its whole length into the perforation from its backside, because the end of the exhaust gas tube is conically expanded in opposite direction to the flow direction of the exhaust gases, and this is, in most cases, not possible because the exhaust gas tube has in many cases along its length a shape differing from the shape of a smooth tube.

SUMMARY OF THE INVENTION

It is an object of the invention to stiffen in a simple manner the area of connection between the end of the exhaust gas tube and the flange and to enable the end of the exhaust gas tube to be introduced into the perforation of the flange or to at least facilitate such operation. For solving this task, the invention essentially consists in that the perforation and the end of the exhaust gas tube are tapered with equal tapering angles in opposite direction to the flow direction of the exhaust gases, in that the exhaust gas tube is, in a manner known per se, snugly engaging at all sides the wall of the perforation over at least part of the thickness extension of the flange and in that the exhaust gas tube is expanded to a greater cross section behind, as seen in flow direction of the exhaust gases, the tapered end of the exhaust gas tube into which greater cross section gradually passes over the greater cross section of the tapered tube end. In this manner, the welding seam is relieved from stress, because any mechanical stress and heat expansion of the exhaust gas tube are, already prior to becoming effective on the welding seam arranged on the free end of the exhaust gas tube, received by the firm fit of the tapered area of the exhaust gas tube within the tapered perforation. On account of the tapered area of the end of the exhaust gas tube and the tapered wall of the perforation having straight-lined generatrices, the tapered end of the exhaust gas tube can firmly be pressed into the perforation. The welding seam becomes only effective as a means for securing the fit of the exhaust gas tube within the perforation and for preventing loosening by extracting forces. The arrangement according to the invention thus provides a high permanent strength of the connecting area between the end of the exhaust gas tube and the flange. On account of the perforation within the flange and the outer surface of the tapered exhaust gas tube being tapered in a gradual manner with the same tapering angle and being mutually congruent in all cross sections, there is reliably made sure a snug engagement of the end of the exhaust gas tube on the perforation of the flange. On account of the end of the exhaust gas tube and the walls of the perforation of the flange being tapered in opposite direction to the flow direction of the exhaust gases, it becomes possible to introduce from the outer side the end of the exhaust gas tube into the perforation of the flange, which substantially facilitates assembling of both components. In consideration of the small wall thickness of an exhaust gas tube, the taper could simply be obtained by reducing the diameter of the tube end. This would, however, reduce in a disadvantageous manner the flow cross section at the tapered tube end, because the taper would then start from the nominal cross section of the exhaust gas tube. However, on account of the exhaust gas tube being expanded to a greater cross section behind, as seen in flow direction of the exhaust gases, the tapered end of the exhaust gas tube, the taper now starts from that area of the exhaust gas tube which is expanded to a greater diameter, so that the narrowest location of the taper does not affect the flow cross section. On account of the greater cross section of the tapered tube end gradually passing over into said expanded area of the exhaust gas tube, any flow disturbances are avoided.

According to the invention, the angle included between the straight-lined generatrices of the perforation and of the tapered end of the exhaust gas tube and a normal line onto the flange may be within the range of 5° to 10°. According to an advantageous embodiment of the invention, the end of the exhaust gas tube is pressed into the perforation.

The expanded area of the exhaust gas tube is conveniently gradually passing over also into the nominal cross section of the exhaust gas tube located in downstream direction. On account of the gradual areas of transition, any disturbance of the flow of the exhaust gases by the expansion is avoided. For the purpose of avoiding any throttling effect, the size of the free cross section within the narrowest area of the tapered end of the exhaust gas tube is, according to the invention, at least equal the size of the free cross section within the area located, as seen in flow direction, behind the expanded area of the exhaust gas tube and having there its nominal cross section.

The arrangement according to the invention offers particular advantages for exhaust pipe bends for plural-cylinder engines, in which several exhaust pipes are combined, for example by welding, one with the other and in which the tapered ends of the exhaust gas tubes are introduced into the perforations of a common flange or of several flanges. By welding the exhaust tubes, there are generated tension forces which become effective on the tapered ends of the exhaust tubes. Any heat expansion becomes more effective in such exhaust tubes being mutually connected by welding, and in case of such exhaust bends, the connecting areas between the ends of the exhaust tubes and the perforations of, respectively, the flange or flanges are subject to particularly high mechanical and thermal stress. These stresses are not only received by the welding seam but are also resisted on account of the firm fit of the tapered ends of the exhaust tubes within the tapered perforations.

If the exhaust gas tube has the shape of a circular cylinder, there results a conical taper of the end of the exhaust gas tube and the perforation within the flange has equally conically tapering walls. In case of exhaust bends, the end of the exhaust tube is, in many cases, out of true, for example pressed to a flat shape, noting that also the shape of the perforation within the flange is adapted to the non-circular shape of the end of the exhaust tube for reliably obtaining a tight and firm fit of the exhaust tube end within the perforation of the flange. In this case, the process for producing an exhaust bend according to the invention is conveniently performed such that the exhaust tube is first expanded and the expanded cross section is subsequently reduced in cross section and adapted to the shape of the perforation in a single process step for producing the tapered end of the exhaust tube.

BRIEF DESCRIPTION OF THE DRAWING

In the drawing, the invention is schematically explained with reference to an example of embodiment.

The drawing shows an exhaust bend for internal combustion engines, the flange and the end of the exhaust tube being shown in a longitudinal section.

DETAILED DESCRIPTION OF THE PREFERRED EMBODIMENT

The exhaust gas tube 1 has in proximity of its end 2 an expanded area 3. Starting from this expanded area 3, the end 2 of the exhaust gas tube is reduced in its diameter, thereby maintaining its full wall thickness. The tapered area is designated by the reference numeral 4. The tapered area 4 of the exhaust gas tube end 2 is inserted into a perforation 5 of a flange 6 which is, for example, screwedly mounted to the effluent exhaust gas openings of the engine. The wall 7 of the perforation 5 is tapered, in opposite direction to the flow direction of the exhaust gases indicated by the arrow 8, for the same tapering angle $\alpha$ as is the exhaust gas tube within the area 4 and extends congruently to the outer surface of the end of the exhaust gas tube in its tapered area 4. The tapered area 4 of the exhaust gas tube 1 is pressed into the perforation 5, so that the tapered area 4 of the end 2 of the exhaust gas tube 1 is firmly seated within the tapered area 9 of the perforation 5 and receives the permanent thermal and mechanical stress at the connecting area 10. The free end 2 of the exhaust gas tube is connected with the wall 5 by a welding seam 11. This welding seam is, however, relieved from stress because the exhaust gas tube 1 is firmly seated with its tapered area within the tapering area 9 of the perforation.

The free area of cross section of the end 2 of the exhaust gas tube at its narrowest location is equal the size of the free area of cross section of the nominal cross section 12 of the exhaust gas tube 1 behind the expanded area 3 as seen in flow direction 8. The exhaust cross section for the exhaust gases is thus not obstructed by the diameter reduction of the exhaust gas tube 1 within the area 4 and, because the reduced area 4 gradually passes over into the expanded area 3 and this expanded area 3 again passes over in a gradual manner into the nominal cross section 12 of the effluent gas tube 1, the gas flow is also not disturbed.

If the end of the exhaust gas tube has the cross section of a circular cylinder, the taper within the area 4 is conical in shape and also the tapered area 9 of the perforation 5 is conical in shape. The cross section in the end 2 of the exhaust gas tube and within the area of the taper 4 may, however, be non-circular in shape. In this case, the tapered arm 9 of the perforation 5 of the flange 6 must extend in congruency with the tapered area 4 of the exhaust gas tube 1 and the tapering angles $\alpha$ of the tapered area 4 of the effluent gas tube 1 and of the tapered area 9 of the perforation 5 must be the same, so that a firm and tight seat of the end of the effluent gas tube 1 within the perforation 5 of the flange 6 is made possible.

The tapering angle $\alpha$ is approximately 5° to 10°. The tapered area 9 of the wall of the perforation 5 extends only over part of the thickness 13 of the flange 6.

In the drawing, the flange 6 is shown to have only one perforation 5. In case of plural-cylinder engines, the flange 6 has a number of perforations 5 corresponding to the number of cylinders, exhaust gas tubes 1 being inserted into said perforations 5.

What is claimed is:

1. A pipe and flange assembly comprising a flange and at least one exhaust manifold in the form of an exhaust gas tube for an internal combustion engine, having an exhaust flow direction, and having a first end located within a perforation of the flange and being connected therewith by a welding seam arranged at an end rim of the exhaust gas tube;

the perforation of the flange and the first end of the exhaust gas tube being conically tapered with straight line generatrices having equal tapering angles ($\alpha$) in opposite direction to the flow direction of the exhaust gases, wherein the exhaust gas tube snugly engages at all sides of the wall of the perforation over at least part of the thickness of the flange;

wherein the exhaust gas tube contains an expanded cross section area located behind, as seen in the flow direction of the exhaust gases, the tapered end of the exhaust gas tube into which a greatest cross section gradually passes over the greater cross section of the tapered end; and wherein the size of a cross section within the narrowest area of the tapered end of the exhaust gas tube is at least equal to the size of a cross section within that area of the exhaust gas tube which is located, as seen in the flow direction, behind the expanded cross section area.

2. A pipe and flange assembly as claimed in claim 1, characterized in that the expanded cross section area of the exhaust gas tube gradually passes over into a nominal cross section of the exhaust gas tube located downstream as seen in the flow direction.

3. A pipe and flange assembly as claimed in claim 1, characterized in that the angle ($\alpha$) included between the straight-lined generatrices of the perforation and of the tapered end of the exhaust gas tube with a line extending in normal relation to the flange is within the range of 5° and 10°.

4. A pipe and flange assembly as claimed in claim 1, characterized in that the end of the exhaust gas tube is press fit into the perforation.

5. A process for producing an exhaust gas tube bend of an internal combustion engine, comprising the steps of:

expanding a cross section of a portion of a length of an exhaust manifold tube of an internal combustion engine extending from a perforation of a flange;

reducing a cross section of an adjacent portion of a length of said exhaust manifold tube to form a conically-tapered end, and wherein said perforation and said conically-tapered end have straight line generatrices;

press fitting the tapered end into the perforation; and welding the edge of the conically-tapered end of said exhaust manifold tube to the sides of the wall of the perforation.

* * * * *